(12) United States Patent
Kuriakose et al.

(10) Patent No.: US 8,376,439 B2
(45) Date of Patent: Feb. 19, 2013

(54) PANELED DECK ASSEMBLY FOR TRANSPORTER VEHICLE

(75) Inventors: Sanjeev Kuriakose, Shippensburg, PA (US); Joseph G. Smitka, Chambersburg, PA (US)

(73) Assignee: Jerr-Dan Corporation, Greencastle, PA (US)

( * ) Notice: Subject to any disclaimer, the term of this patent is extended or adjusted under 35 U.S.C. 154(b) by 142 days.

(21) Appl. No.: 12/748,319

(22) Filed: Mar. 26, 2010

(65) Prior Publication Data
US 2011/0233952 A1    Sep. 29, 2011

(51) Int. Cl.
*B62D 33/02* (2006.01)
(52) U.S. Cl. .. 296/39.2; 280/781; 280/789; 296/193.07; 296/26.09; 414/477
(58) Field of Classification Search ............... 411/366.1; 414/477; 52/588.1; 296/39.2, 193.07, 204, 296/26.08, 26.09, 26.11; 280/789, 149.2, 280/423, 785, 781, 795, 800
See application file for complete search history.

(56) References Cited

U.S. PATENT DOCUMENTS

| | | | | |
|---|---|---|---|---|
| 2,587,265 A | * | 2/1952 | Wright | 414/537 |
| 3,010,757 A | * | 11/1961 | De Haan | 296/35.1 |
| 3,442,224 A | * | 5/1969 | Rutkoski | 410/113 |
| 3,550,801 A | * | 12/1970 | Larson et al. | 414/480 |
| 3,633,647 A | * | 1/1972 | Leitgeb | 160/220 |
| 3,675,800 A | * | 7/1972 | Weyant et al. | 414/494 |
| 3,856,344 A | | 12/1974 | Loeber | |
| 4,758,128 A | | 7/1988 | Law | |
| 4,838,605 A | | 6/1989 | Abromavage | |
| 5,381,638 A | * | 1/1995 | Andersson | 52/592.1 |

(Continued)

FOREIGN PATENT DOCUMENTS

| | | | |
|---|---|---|---|
| GB | 2032509 | * | 8/1980 |
| JP | 08-113168 | | 5/1996 |
| KR | 19909338 | | 10/1990 |

OTHER PUBLICATIONS

International Search Report and Written Opinion for Application No. PCT/US2011029786, mail date Dec. 22, 2011, 7 pages.

*Primary Examiner* — Glenn Dayoan
*Assistant Examiner* — Pinel Romain
(74) *Attorney, Agent, or Firm* — Foley & Lardner LLP

(57) ABSTRACT

A deck assembly for use with a transporter vehicle is provided. The deck assembly includes a fastener, a first deck panel including an upper support surface, a first side wall and a second side wall, the first side wall defining at least one first opening, the second side wall defining at least one second opening and a second deck panel coupled to the first deck panel, the second deck panel including an upper support surface, a first side wall and a second side wall, the first side wall defining at least one first opening, the second side wall defining at least one second opening. The second side wall of the first deck panel is supported adjacent to the first side wall of the second deck panel such that the at least one first opening of the first deck panel is at least partially aligned with the at least one second opening of the second deck panel to define a through hole for the fastener. The fastener is received within the through hole and secures the first deck panel to the second deck panel.

20 Claims, 17 Drawing Sheets

U.S. PATENT DOCUMENTS

| | | | |
|---|---|---|---|
| 5,595,038 A * | 1/1997 | Prestenback | 52/592.1 |
| 5,791,093 A * | 8/1998 | Diamond | 52/36.5 |
| 6,283,538 B1 | 9/2001 | Reitnouer | |
| 6,408,586 B1 | 6/2002 | Deckert | |
| 6,421,970 B1 * | 7/2002 | Martensson et al. | 52/282.1 |
| 6,719,363 B2 * | 4/2004 | Erlandsson et al. | 296/193.07 |
| 7,926,848 B2 | 4/2011 | Sherbeck et al. | |
| 8,152,200 B2 | 4/2012 | Murray et al. | |

\* cited by examiner

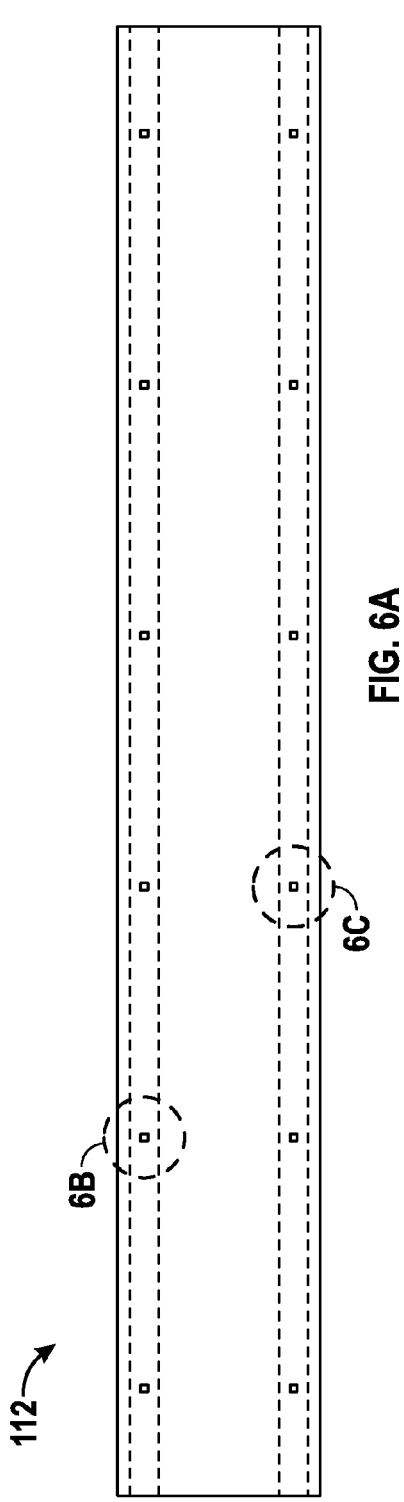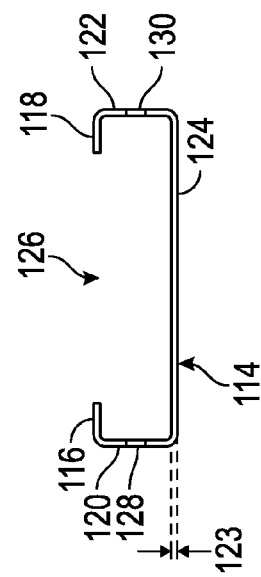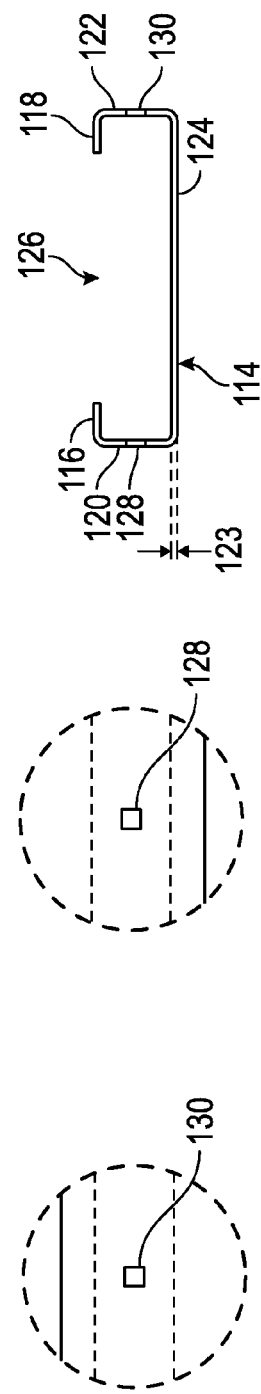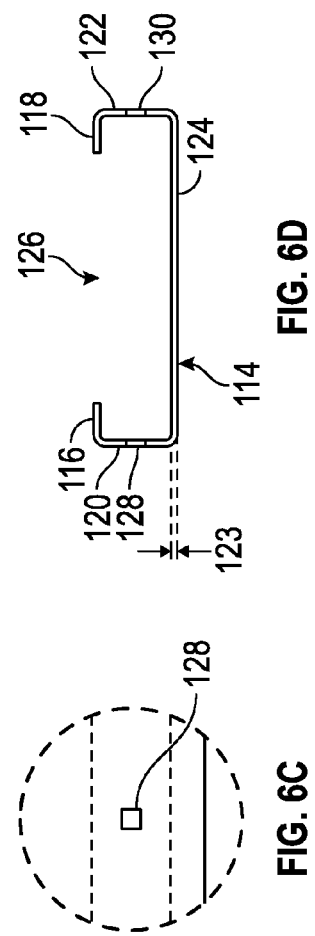

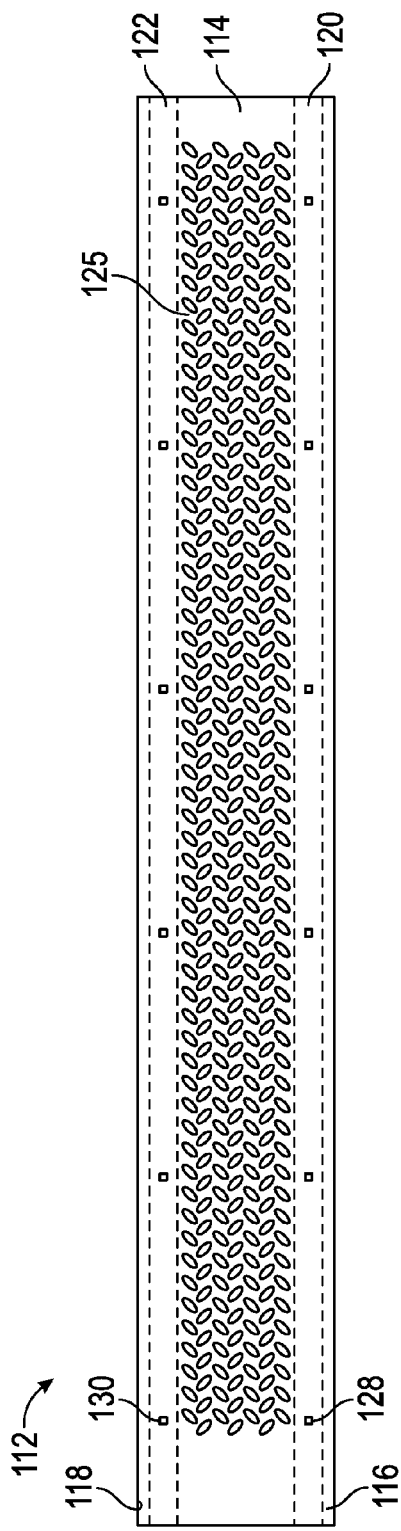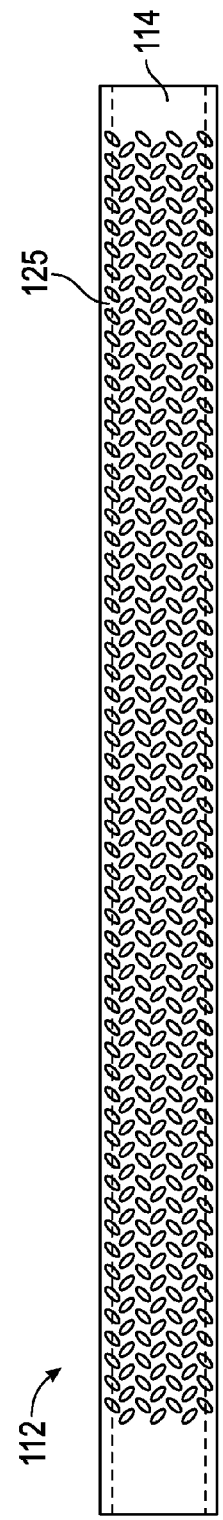

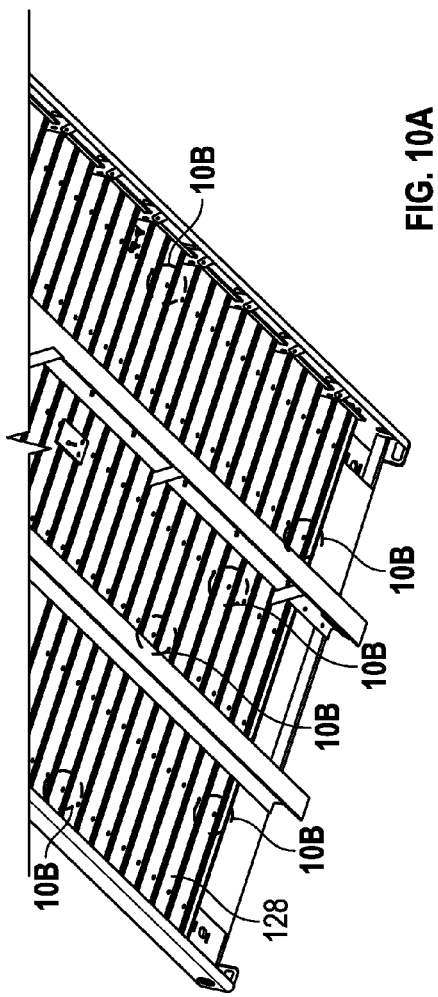
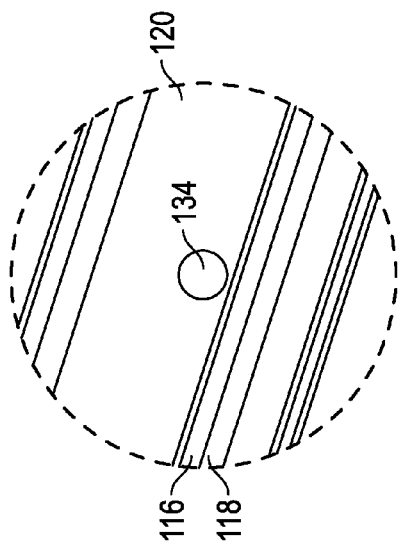

PANELED DECK ASSEMBLY FOR TRANSPORTER VEHICLE

BACKGROUND

The present disclosure relates generally to the field of transporter vehicles (e.g., carriers, roll-back type transporting vehicles, flat bed trucks, etc.). More specifically, the present disclosure relates to the construction and/or assembly of a deck assembly (e.g., carrier bed, platform, support surface, etc.) suitable for use with a transporter vehicle.

Transporter vehicles have a deck assembly defining a surface suitable for supporting a load (e.g., a vehicle, industrial equipment, containers, etc.). A carrier truck is a type of transporter vehicle that includes a deck assembly that is movably supported upon a chassis and/or sub-frame of the carrier truck (i.e., a roll-back deck, etc.). The deck assembly of the carrier truck is tiltable relative to the chassis between a transport position, at which the deck assembly extends parallel to the chassis, and a loading position, at which the deck assembly extends at an angle relative to the chassis and contacts the ground, defining an approach angle. A vehicle or other load to be transported upon the surface defined by the deck assembly is moved upwardly onto the surface, and the deck assembly is then returned to the transport position.

Due to the complexity of known deck assemblies, manufacturing such deck assemblies often requires skilled workers and may be relatively time consuming. Accordingly, there remains a need to provide an improved deck assembly that can be manufactured in a more efficient manner.

SUMMARY

An exemplary embodiment of the present invention relates to a deck assembly for a transporter vehicle. The deck assembly includes a fastener, a first deck panel including an upper support surface, a first side wall and a second side wall, the first side wall defining at least one first opening, the second side wall defining at least one second opening and a second deck panel coupled to the first deck panel, the second deck panel including an upper support surface, a first side wall and a second side wall, the first side wall defining at least one first opening, the second side wall defining at least one second opening. The second side wall of the first deck panel is supported adjacent to the first side wall of the second deck panel such that the at least one first opening of the first deck panel is at least partially aligned with the at least one second opening of the second deck panel to define a through hole for the fastener. The fastener is received within the through hole and secures the first deck panel to the second deck panel.

Another exemplary embodiment of the present invention relates to a transporter vehicle. The transporter vehicle includes a chassis, a cab supported by the chassis and a deck assembly supported by the chassis rearward of the cab. The deck assembly comprising a first side board, a second side board, a substructure and a deck portion. The deck portion is supported by the first side board, a second side board and a substructure. The deck portion includes a fastener, a first deck panel including an upper support surface, a first side wall and a second side wall, the first side wall defining at least one first opening, the second side wall defining at least one second opening and a second deck panel coupled to the first deck panel, the second deck panel including an upper support surface, a first side wall and a second side wall, the first side wall defining at least one first opening, the second side wall defining at least one second opening. The second side wall of the first deck panel is supported adjacent to the first side wall of the second deck panel such that the at least one first opening of the first deck panel is at least partially aligned with the at least one second opening of the second deck panel to define a through hole for the fastener. The fastener is received within the through hole and secures the first deck panel to the second deck panel.

Another exemplary embodiment of the present invention relates to a method of assembling a deck assembly for a transporter vehicle having a first side board, a second side board, a substructure and a deck portion. The method includes the steps of preassembling the deck portion. The deck portion includes a plurality of deck panels. The deck panels include an upper support surface, a first side wall and a second side wall. The first side wall defines at least one first opening having a first dimension. The second side wall defines at least one second opening having a second dimension that is less than the first dimension. The method of preassembling the deck portion includes the steps of positioning a first deck panel parallel and adjacent to a second deck panel such that the at least one second opening of the first deck panel is substantially aligned with the at least one first opening of the second deck panel to define a through hole and inserting a fastener into the through hole by first passing through the second side wall of the first deck panel and then through the first wall of the second deck panel. The fastener has a flange and a threaded portion. The method of preassembling the deck portion also includes the steps of engaging the flange with an edge of the second wall of the first deck panel that defines the at least one second opening to restrict the rotation of the fastener and applying a nut to the threaded portion of the fastener to draw the first deck panel against the second deck panel. The method of assembling the deck assembly also includes the steps of mounting the preassembled deck portion to the substructure, mounting the first side board to a first lateral edge of the preassembled deck portion and mounting the second side board to an opposite second lateral edge of the preassembled deck portion.

BRIEF DESCRIPTION OF THE DRAWINGS

FIG. 6A is a top view of a preformed deck panel according to an exemplary embodiment.

FIG. 6B is a detailed view of FIG. 6A showing a second opening according to an exemplary embodiment.

FIG. 6C is a detailed view of FIG. 6A showing a first opening according to an exemplary embodiment.

FIG. 6D is a side view of the deck panel of FIG. 6A after being formed into a desired shape.

FIG. 7A is top view of a preformed deck panel according to an exemplary embodiment.

FIG. 7B is a top view of the deck panel of FIG. 7A after being formed into a desired shape.

FIG. 10A is a partial isometric view of the underside portion of the deck assembly of FIG. 3 showing the deck panel from an opposite second direction.

FIG. 10B is a detailed view of FIG. 10A showing a second side of the fastener.

DETAILED DESCRIPTION

Figure 1:
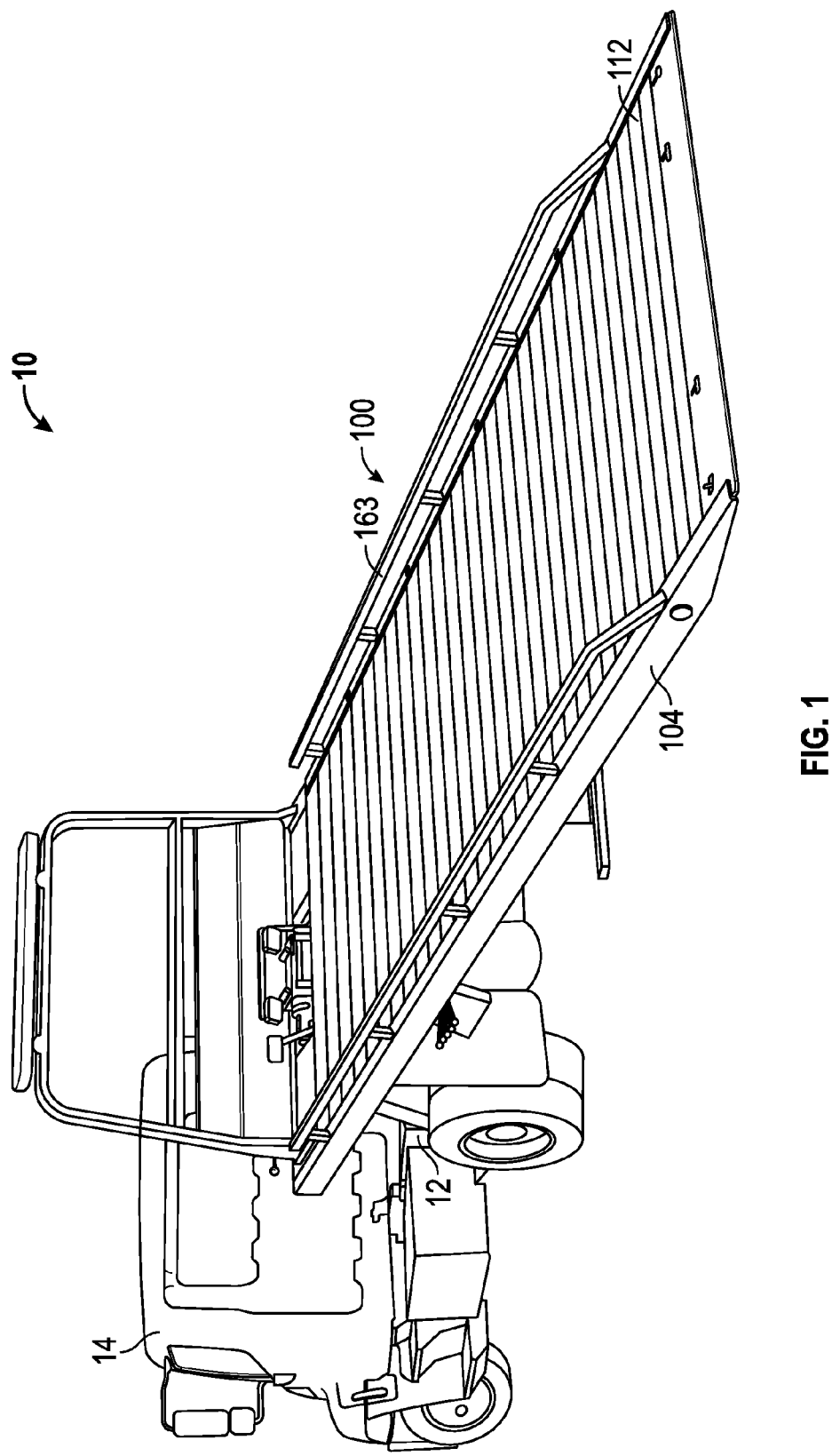
FIG. 1 is an isometric view of a transporter vehicle having a deck assembly according to an exemplary embodiment.

Referring generally to the FIGURES, a deck assembly 100 and components thereof are shown according to exemplary embodiments. Deck assembly 100 is configured to be secured to a transporter vehicle (e.g., recovery vehicle, flat bed truck, towing apparatus, etc.), shown as a carrier 10, and is configured to support a load (e.g., a disabled vehicle, industrial equipment, container, etc.). Deck assembly 100 generally comprises a deck portion 102 that includes a plurality of support members (e.g., slats, cross members, etc.), shown as deck panels 112, that cooperate to define a support surface 108 for the load. According to an exemplary embodiment, deck portion 102 is preassembled by coupling deck panels 112 to each other using one or more mechanical fasteners. Such a configuration may provide for improved manufacturability (e.g., by requiring less training for workers, by reducing production times, by reducing the amount of weld smoke, etc.) and serviceability (e.g., by simplifying the repair and/or replacement of individual panels, etc.).

Before discussing the details of deck assembly 100 and carrier 10, it should be noted at the outset that references to "front," "back," "rear," "upper," "lower," "top," "bottom," "right," and "left" in the description are merely used to identify the various elements as they are orientated in the FIGURES, with "front," "back" and "rear" being relative to the direction of travel of carrier 10 and "upper," "lower," "top," "bottom," "right" and "left" being relative to the perspective of the driver. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members and any additional intermediate members being attached to one another. Such joining may be permanent in nature or alternatively may be removable or releasable in nature.

It should further be understood that, although deck assembly 100 will be described in detail herein with reference to carrier 10, deck assembly 100 disclosed herein may be applied to, and find utility in, other types of transporter vehicles as well. For example, the deck assembly may be suitable for use with transporter vehicles having a stationary deck assembly or any other transporter vehicle having a deck or platform configured to support a load.

Figure 2:
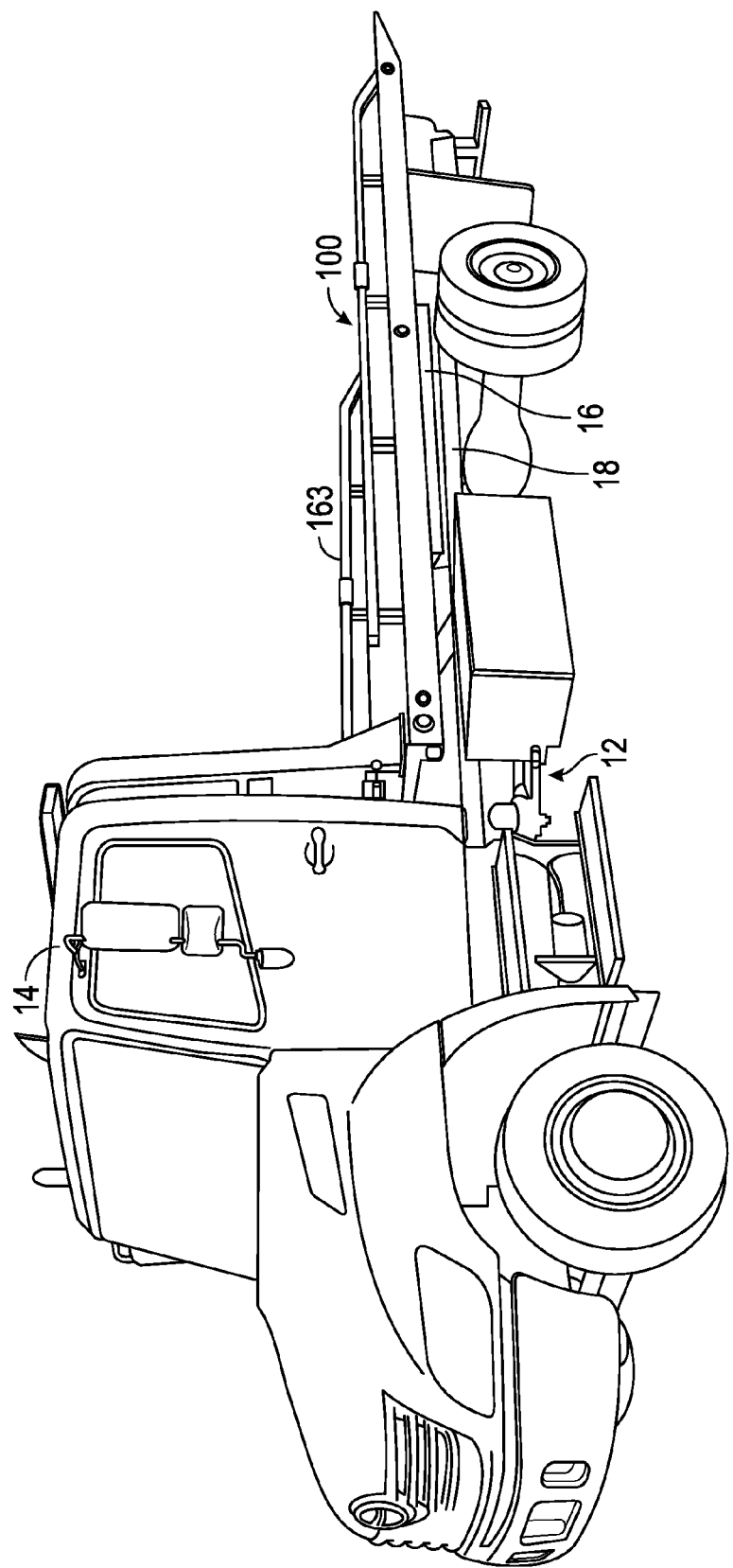
FIG. 2 is an isometric view of the transporter vehicle of FIG. 1 showing the deck assembly in a transport position.

Referring to FIGS. 1 and 2, deck assembly 100 is shown mounted on carrier 10. Carrier 10 is a roll-back type transporter vehicle that generally comprises a chassis 12, a cab 14 and a sub-frame 16. Deck assembly 100 is supported rearward of cab 14 and is configured to be selectively moved by an operator between a transport position, at which deck assembly 100 extends parallel to chassis 12 (shown in FIG. 1), and a loading position, at which deck assembly 100 extends at an angle relative to chassis 12 and may contact the ground, defining an approach angle (shown in FIG. 2). According to the embodiment illustrated, deck assembly 100 is slidably coupled to sub-frame 16 which is in turn rotatably coupled to chassis 12, thereby allowing deck assembly 100 to be slidable and tiltable relative to chassis 12 so that a disabled vehicle and/or any other object can be selectively loaded onto and/or removed from carrier 10.

Chassis 12 includes one or more frame members, shown as first and second rails 18 arranged as two generally parallel chassis rails, extending in a fore and aft direction. First and second rails 18 as elongated structural or supportive members (e.g., a beam, channel, tubing, extrusion, etc.) spaced apart laterally and defining a void or cavity which generally constitutes the centerline of carrier 10. Chassis 12 may also include one or more cross-members 20 extending between first and second rails 18 in a direction that is substantially perpendicular to the centerline of carrier 10. Sub-frame 16 is rotatably coupled to chassis 12 and also includes one or more frame members, shown as third and fourth rails 20 arranged as two generally parallel rails, extending in a fore and aft direction.

One or more powered actuator devices (e.g., hydraulic cylinders, screw actuators, etc.) are coupled to sub-frame 16 for moving deck assembly 100 between the stowed or transport position and the tilted loading position. When it is desired to move deck assembly 100 to the tilted loading position, the one or more actuator devices may be provided to slide deck assembly 100 rearwardly relative to sub-frame 16, while another one or more actuator devices may be provided to tilt sub-frame 16 relative to chassis 12 until a free end of deck assembly 100 is close or adjacent to the ground. Once in the loading position, a vehicle to be transported (e.g., a disabled vehicle, etc.), and/or any other load to be carried by carrier 10, can be moved onto deck assembly 100, by a winch or some other means, and deck assembly 100 may then be returned to the transport position.

Figure 3:
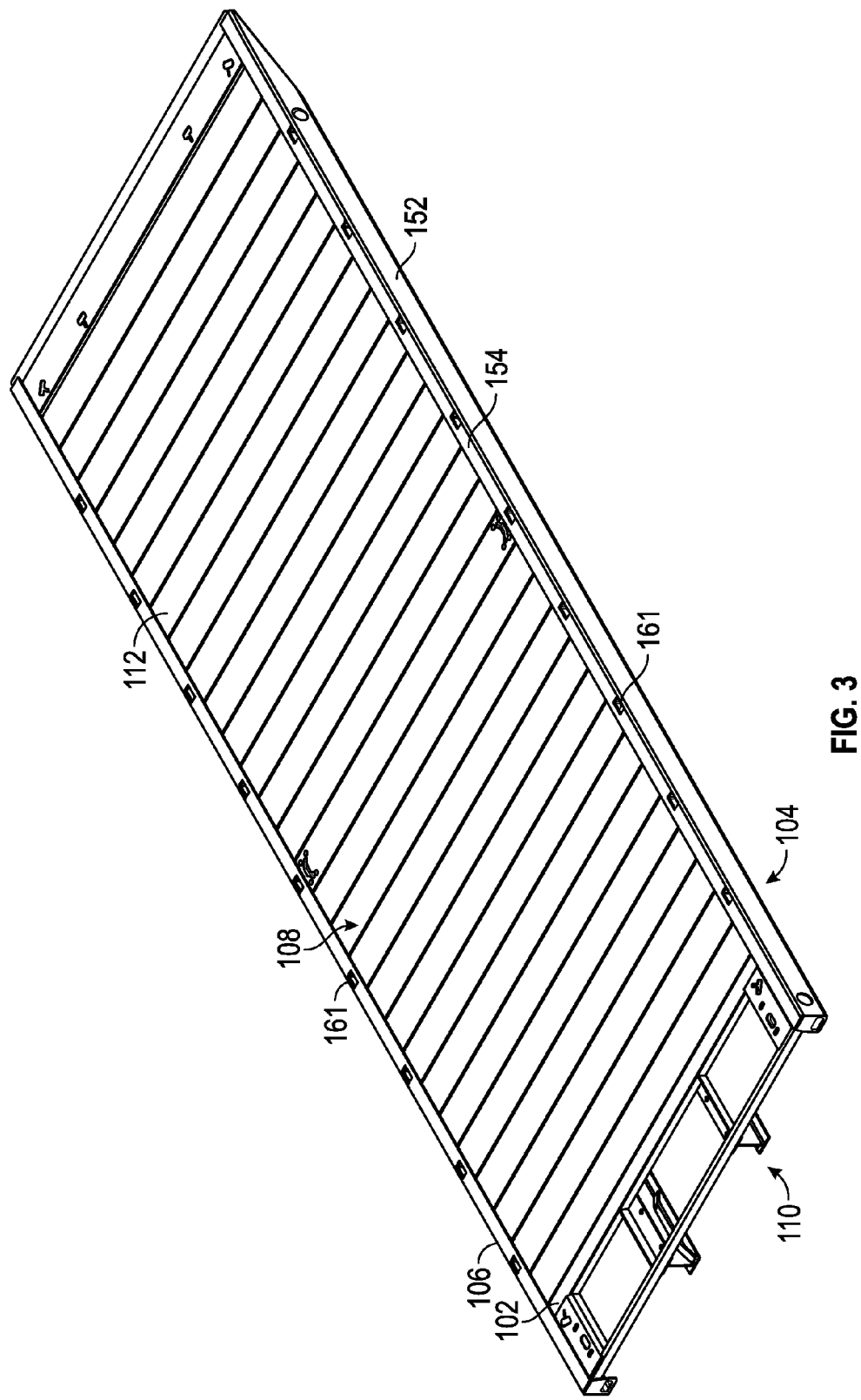
FIG. 3 is an isometric view of a deck assembly according to an exemplary embodiment.
Figure 4:
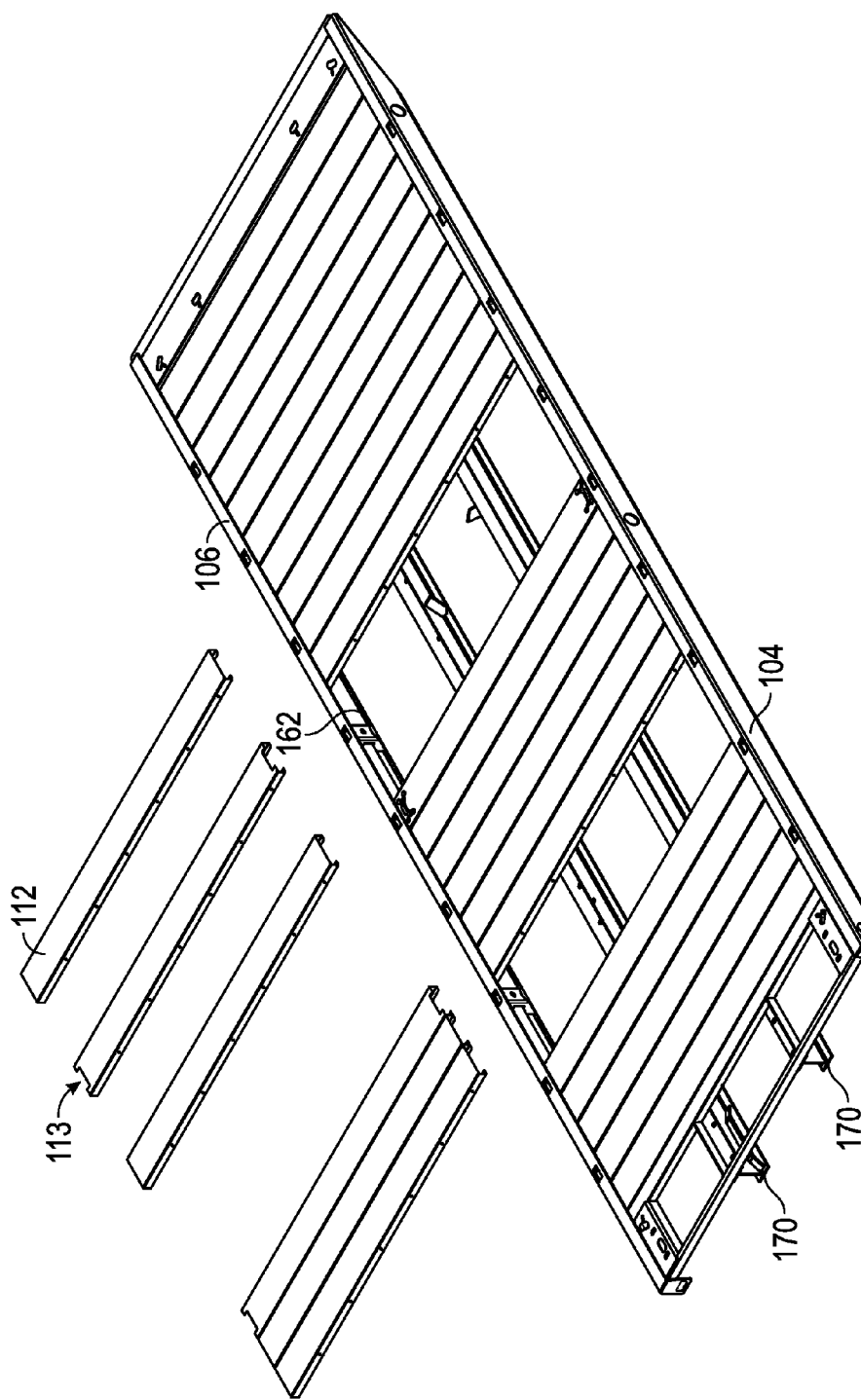
FIG. 4 is a partially exploded top isometric view of the deck assembly of FIG. 3.
Figure 5:
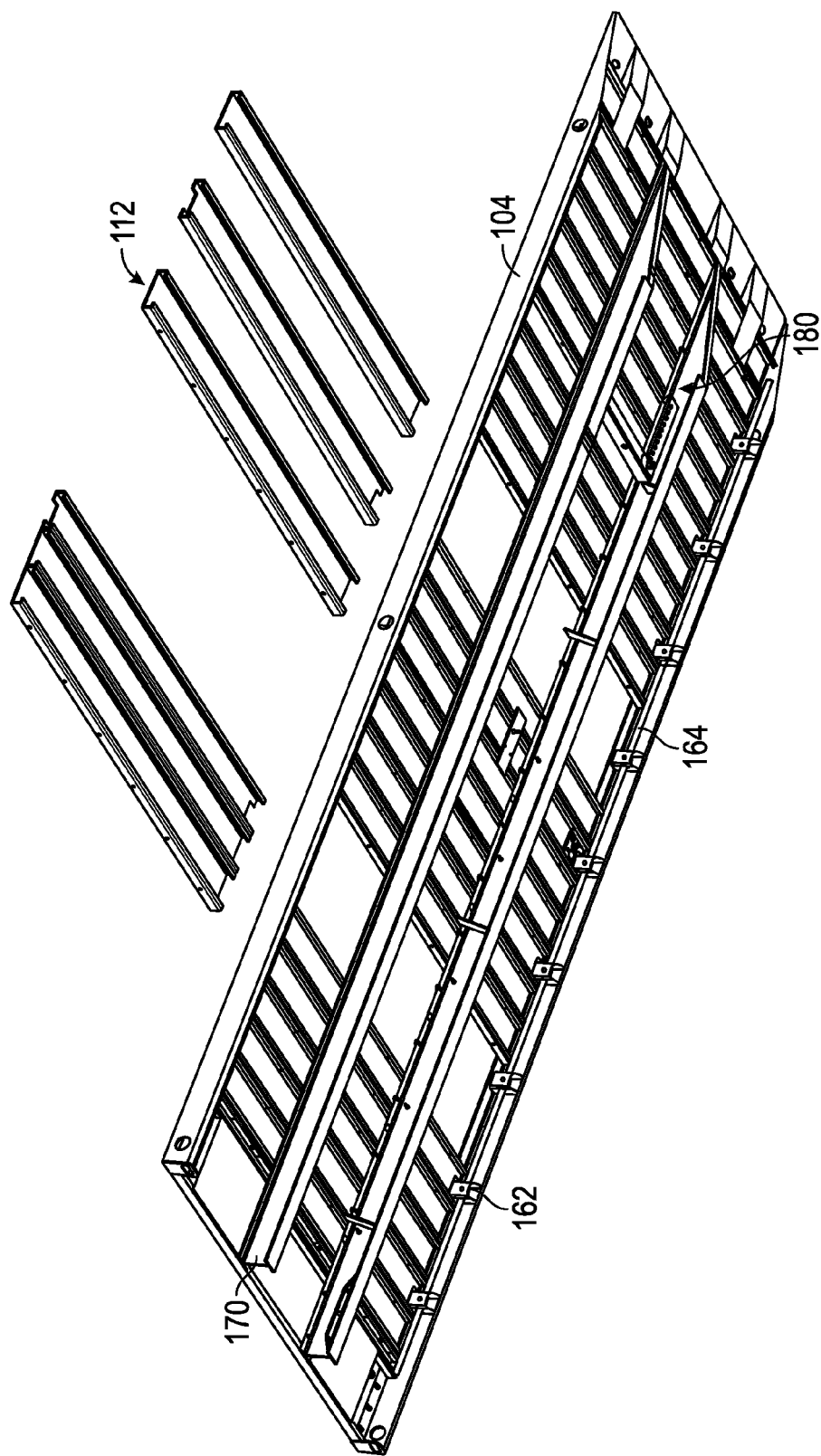
FIG. 5 is a partially exploded bottom isometric view of the deck assembly of FIG. 3.
Figure 8A:
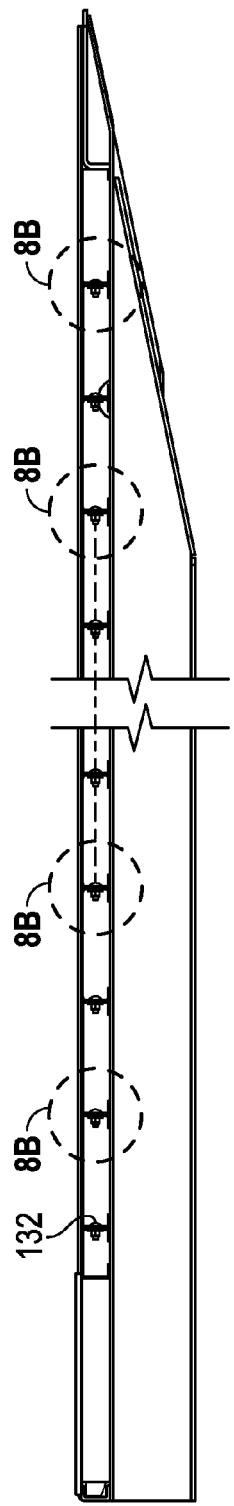
FIG. 8A is a cross sectional view of the deck assembly of FIG. 3 showing the positioning of adjacent deck panels.
Figure 8B:
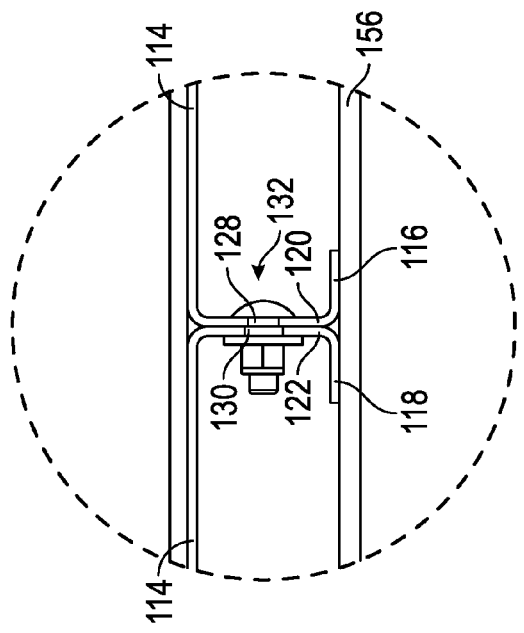
FIG. 8B is a detailed view of FIG. 8A showing a point of coupling between adjacent deck panels.
Figure 9A:
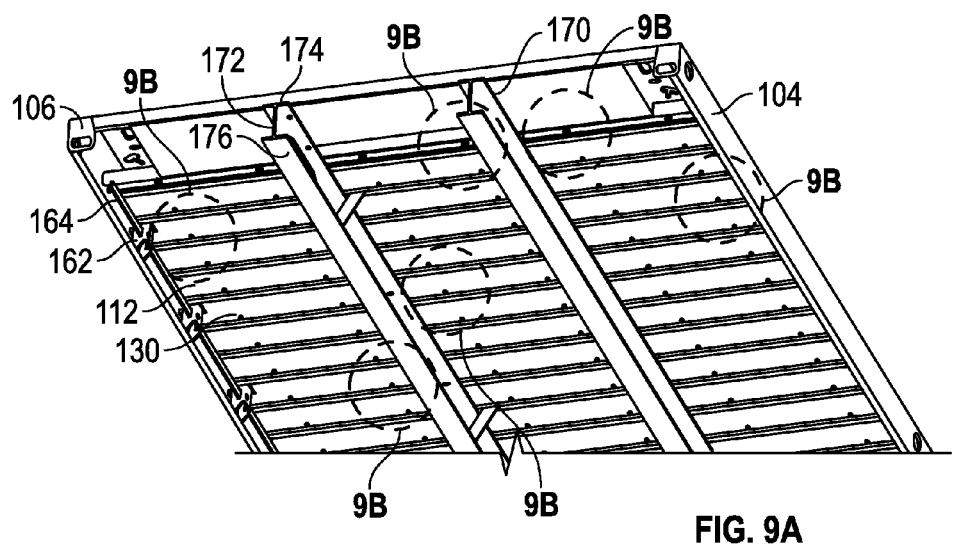
FIG. 9A is a partial isometric view of an underside portion of the deck assembly of FIG. 3 showing a deck panel from a first direction.
Figure 9B:
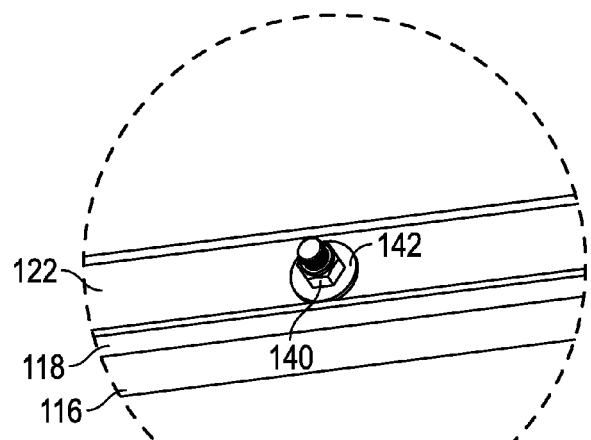
FIG. 9B is a detailed view of FIG. 9A showing a first side of a fastener according to an exemplary embodiment.
Figure 11:
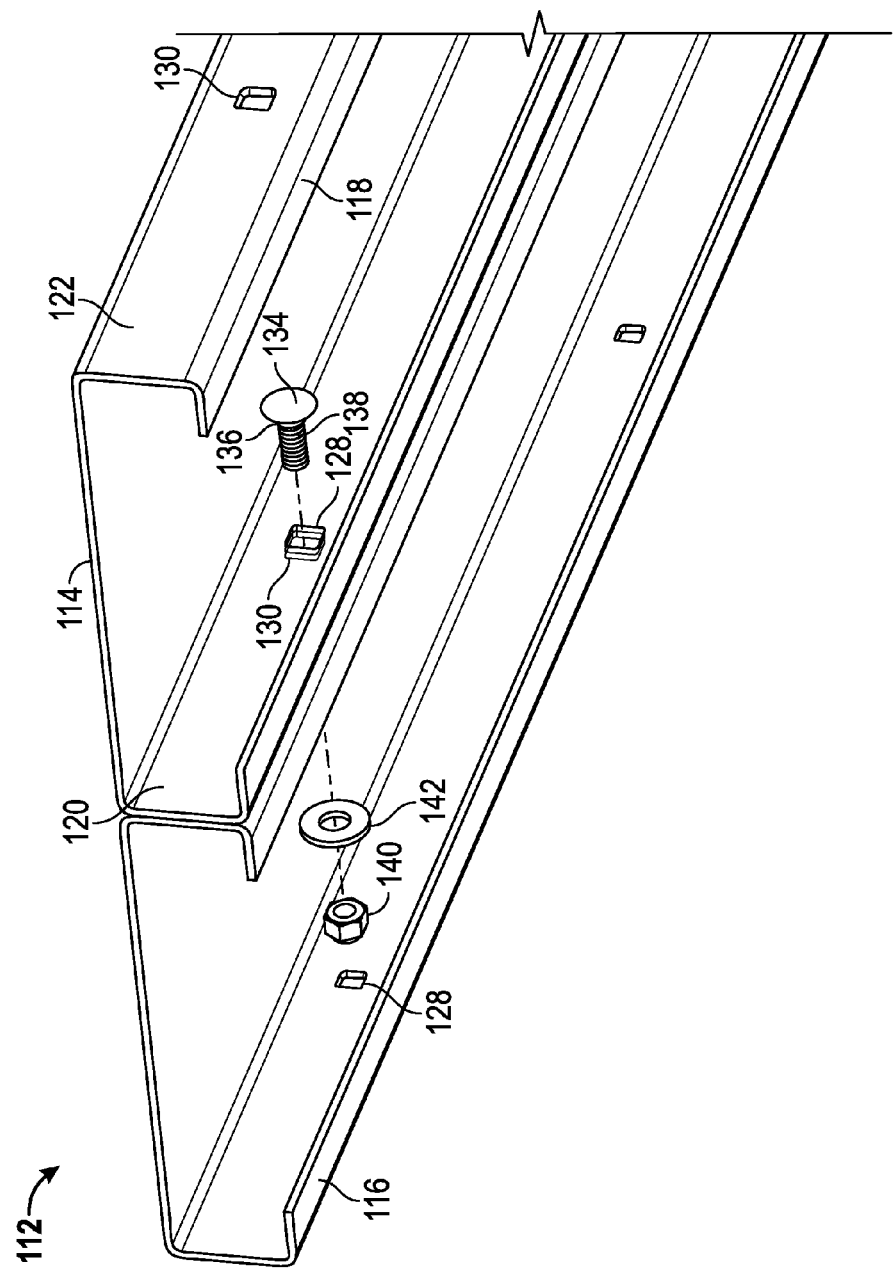
FIG. 11 is a partial isometric view of the deck assembly of FIG. 3 showing the assembly of two adjacent deck panels.

Referring to FIGS. 3 through 5, deck assembly 100 is shown according to an exemplary embodiment. Deck assembly 100 generally includes deck portion 102, a first side support member (e.g., side board, side rail, etc.), shown as a first rubrail 104, and a second side support member (e.g., side board, side rail, etc.), shown as a second rubrail 106. Deck portion 102 defines a deck surface 108 configured to support a vehicle or other object being transported, while first rubrail 104 and second rubrail 106 are configured to provide support (e.g., rigidity to reduce deflection, torsion, bending, etc.) to deck portion 102 and/or seal the lateral ends of deck portion 102. For additional support, and/or to provide a structure for interacting with sub-frame 16, deck assembly 100 is also shown as including an undercarriage or substructure 110 provided under deck portion 102.

Deck portion 102 is formed of a plurality of members (e.g., planks, slats, etc.), shown as deck panels 112. Deck panels 112 are supported at a generally horizontal orientation and aligned to be generally parallel to each other in a direction that is generally perpendicular to the centerline of carrier 10. Deck panels 112 are positioned closely adjacent to each other in a successive manner to define deck surface 108. According to an exemplary embodiment, adjacent deck panels 112 are abutted against each other so that there is little or no gap between adjacent deck panels 112. Such a configuration enables the load to be supported directly on top of deck panels 112 without requiring an additional sheet material or covering layer to be laid down over deck panels 112 to cover any large gaps between deck panels 112. The number of deck panels 112 defining deck surface 108 may vary depending on the overall length of deck portion 102 and the size of deck panels 112.

Referring to FIGS. 6A though 7B, each deck panel 112 is shown as including a top wall, shown as a platform 114, a first support foot, shown as a first bottom wall 116, a second support foot, shown as a second bottom wall 118, a first web, shown as a first side wall 120, extending between a first or rear edge of platform 114 and first bottom wall 116, and a second web, shown as a second side wall 122, extending between a second or front edge of platform 114 and second bottom wall 118. According to the embodiment illustrated, first bottom wall 116, second bottom wall 118, first side wall 120 and second side wall 122 are integrally formed with platform 114 to provide a deck panel that is a one-piece unitary body. According to the various alternative embodiments, first bottom wall 116, second bottom wall 118, first side wall 120 and second side wall 122 may be formed as one or more separate members that are subsequently coupled to platform 114 to form deck panel 102.

Platform 114 is configured to extend in a substantially horizontal orientation and includes a top surface 124 that cooperates with the top surface of adjacent deck panels 112 to define deck surface 108. According to an exemplary embodiment, top surface 124 of platform 114 includes an outwardly protruding crown 123 to provide additional stiffness and/or to improve load support and distribution. Such a configuration may facilitate load distribution to push against an adjacent deck panel 112 and allow adjacent deck panels 112 to share the stress rather than realize a localized stress. Such a configuration may also put the joints between adjacent deck panels 112 in compression rather than in tension which may be optimal for design and durability. According to the embodiment illustrated, platform 114 is provided with a crown 123 that is between approximately 0.020 inches and approximately 0.030 inches. According to the various alternative embodiments, platform 114 may be provided with a crown 123 that is greater or less than the dimensions provided herein or may be provided as a completely flat surface without any crown whatsoever.

According to a first exemplary embodiment, shown in FIG. 6A through 6D, top surface 124 is a generally smooth surface that is substantially the same as the other outward surfaces of deck panel 102. According to a second exemplary embodiment, shown in FIGS. 7A and 7B, a central portion of top surface 124 includes a friction element 125 (e.g., tread surface, etc.) configured to assist in providing traction along top surface 124, stiffening of platform 114 and/or improving the aesthetics of deck portion 102. According to an exemplary embodiment, friction element 125 is integrally formed with deck panel 112 and comprises one or more projections and/or recesses along top surface 124. According to the various alternative embodiments, friction element 125 may a separate component or treatment that is applied to top surface 124.

According to the embodiment illustrated, friction element 125 is a pressed or embossed pattern provided in top surface 124. Friction element 125 is shown as being a diamond pattern (e.g., diamond plate, etc.), but alternatively, may be provided in any of a variety of shapes and/or patterns (e.g., rectangular, square, circular, triangular, etc.). The pressed diamond pattern does not cover the entire outer surface of deck panel 112, but rather is shown as being offset from the lateral ends of deck panel 112 and from the front and rear edges that transition into first side wall 120 and second side wall 122 respectively. The remaining portions of deck panel 112 (i.e., first bottom wall, second bottom wall, first side wall and second side wall), have an outer surface that is relatively smooth or flat. Such a configuration allows adjacent deck panels 112 to lock tightly against each other (e.g., because the outer surfaces of first side wall 120 and second side wall 122 are relatively smooth) and provides deck panel with a smooth or even surface for coupling to first rubrail and second rubrail (e.g., because the outer surfaces of first bottom wall 116 and second bottom wall 118 are relatively smooth).

First side wall 120 extends downward from a rear edge of platform 114 in a direction that is substantially perpendicular to platform 114. Second side wall 122 is spaced apart from first side wall 120 in a fore and aft direction of carrier 10 and extends downward from a front edge of platform 114 in a direction that is substantially parallel to first side wall 120. The length of first side wall 120 and second side wall 122 will vary depending on the application and the height at which deck panels 112 are needed. Extending inward from a bottom edge of first side wall 120 and second side wall 122 are first bottom wall 116 and second bottom wall 118, respectively. First bottom wall 116 and second bottom wall 118 extend inward in an orientation that is substantially perpendicular to first side wall 120 and second side wall 122 and substantially parallel to platform 114. According to the embodiment illustrated, a space or gap 126 is provided between the free ends of first bottom wall 116 and second bottom wall 118. Gap 126 provides clearance for a fastener (e.g., nut, etc.) to be applied from the inside of first side wall 120 and/or second side wall 122. Such a configuration provides for deck panel 102 with a substantially U-shaped cross section.

First side wall 120 defines one or more apertures (e.g., slots, recesses, through-holes, etc.), shown as first openings 128, while second side wall 122 defines one or more apertures (e.g., slots, recesses, through-holes, etc.), shown as second openings 130. According to an exemplary embodiment, at least one of first openings 128 and second openings 130 have a shape that is configured to restrict a fastener from rotating when inserted in the opening. First openings 128 may have substantially the same shape as second openings 130, or alternatively, may have different shapes. According to the embodiment illustrated, first openings 128 have substantially the same shape as second openings 130 but are formed of different sizes. In particular, first openings 128 and second openings 130 are each shown as having a substantially square hole pattern with first openings 128 being at least slightly small than second openings 130.

When deck portion 102 is assembled, one or more first openings 128 of a first deck panel 112 are substantially aligned with and in communication with one or more second openings 130 of an adjacent second deck panel 112. The smaller opening is used to effectively hold a fastener in place, while the larger opening is used to compensate for any tolerances or clearance needed to ensure a substantially square and level fit of adjacent deck panels 112. The smaller opening corresponds to side in which the fastener is inserted from. According to the embodiment illustrated, first openings 128 are smaller than second openings 130.

According to various exemplary embodiments, deck panels 112 may have any of a number of suitable cross-sectional profiles having an upper platform and a structure for coupling deck panels 112 to an adjacent deck panel. Also, first openings 128 and second openings 130 may be provided in any of a number of shapes and sizes, wherein at least the shape of the smaller opening is configured to restrict rotation of the fastener.

According to an exemplary embodiment, deck panels 112 are formed of steel. More specifically, deck panels 102 are formed of a galvanized or galvanneal steel product. Forming deck panels 112 of such a material may protect deck panels 112 against corrosion and/or may protect against corrosion between adjacent deck panels 112 after a finishing process (e.g., a paint process, etc.) is applied to deck portion 102. According to the various alternative embodiments, deck panels 112 may be formed of any suitable material, including, but not limited to, aluminum, composites (e.g., fiberglass, etc.), plastics, alloys, bi-metals or combinations thereof.

Referring to FIGS. 8A through 11, during a preassembly process of deck assembly 100 in which deck portion 102 is formed, one or more mechanical fasteners (e.g., bolts, screws, pins, rivets, clips, etc.) are used to secure adjacent deck panels 112 to each other. Using a mechanical fastener rather than a welding operation may provide for improved manufacturability (e.g., by requiring less training for workers, by reducing production times, by reducing the amount of weld smoke, etc.) and serviceability (e.g., by simplifying the repair and/or replacement of individual panels, etc.).

According to an exemplary embodiment, the one or more mechanical fasteners comprise a one-sided carriage bolt 132 having a head 134, a shoulder or flange 136 and a threaded portion 138. Flange 136 is located between head 134 and threaded portion 138 and has a cross section that is orthogonal to an axis of threaded portion 138. The cross sectional shape of flange 136 is selected to resist rotation of carriage bolt 132 along the axis defined by threaded portion 138 when inserted into first opening 128 and/or second opening 130. Such a configuration facilitates an efficient preassembly of deck portion 102 because a tool does not need to be applied to both sides of the fastener when tightening the fastener to secure adjacent deck panels 112.

According to an exemplary embodiment, flange 136 has a cross sectional shape that is substantially the same as the shape of first opening 128 and/or second opening 130. According to the embodiment illustrated, the cross sectional shape of flange 136 is substantially square. The outer periphery of flange 136 is sized to fit within at least first opening 128 while still being able to resist significant rotation by engaging an inside edge of side wall 120 that defines first opening 128. As such, according to an exemplary embodiment, flange 136 is only slightly smaller than first opening 128. The thickness of flange 136 is sufficient to at least partially engage an edge of side wall 120 that defines first opening 128 when carriage bolt is inserted into the opening.

To draw adjacent deck panels 112 towards each other, the one or more fasteners also comprise a nut 140 that is threaded to mate with threaded portion 138 of carriage bolt 132. According to an exemplary embodiment, nut 140 is a self-locking nut to facilitate secure tightening against two adjacent deck panels 112 and to prevent slippage between nut 140 and threaded portion 138. The one or more fasteners may also include a washer 142 that has a bore for receiving threaded portion 138 of carriage bolt 132 before nut 140 is applied. Washer 142 may assist in securing nut 140 to threaded portion 138 and/or may be sized to cover up the larger opening on a side opposite to which the fastener is being inserted from.

According to the embodiment illustrated, carriage bolt 132 is inserted through the opening defined by first opening 128 and second opening 130 by first passing through first opening 128 (i.e., the smaller opening) and then passing through second opening 130 (i.e., the larger opening). The side wall of first opening 128 engages flange 136 and prevents carriage bolt 132 from rotating about an axis defined by threaded portion 138 with washer 142 and nut 140 are applied from an opposite side. According to an exemplary embodiment, deck panels 112 comprise a plurality of first openings 128 and second openings 130 configured to receive a fastener for coupling (e.g., directly coupling, etc.) adjacent deck panels 112 to each other. According to the embodiment illustrated, six fasteners, and thereby six first openings 128 and second openings 130, are used to couple together adjacent deck panels 112.

Once adjacent deck panels 112 are secured to each other and deck portion 102 is formed, the entire deck portion 102 can be mounted to first rubrail 104, second rubrail 106 and/or substructure 110. First bottom walls 116 and second bottom walls 118 of individual deck panels 112 provide a structure for coupling deck portion 102 to first rubrail 104, second rubrail 106 and/or substructure 110. Referring to the exemplary embodiment shown in FIG. 8A, the deck panels are positioned transverse to a longitudinal direction, shown as 'x' direction, of the carrier vehicle and the deck portion. According to an exemplary embodiment, deck portion 102 is mounted without providing any additional coupling between adjacent deck panels 112 other than the use of mechanical fasteners. According to the various alternative embodiments, adjacent deck panels 112 may be further coupled to one another, for example by using a welding operation or any other suitable coupling means if desired.

Figure 12A:
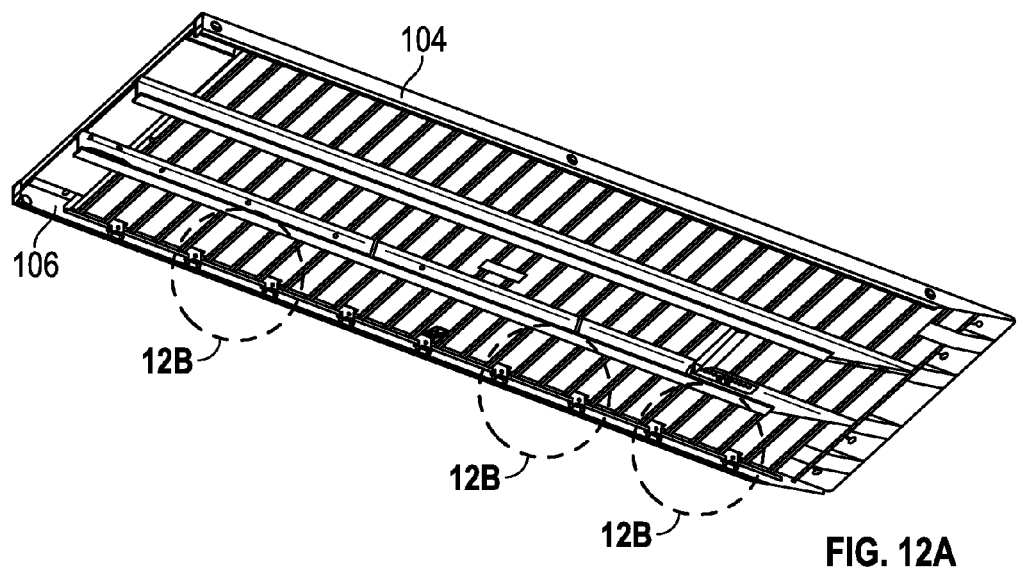
FIG. 12A is a bottom isometric view of the deck assembly of FIG. 3 showing the support structure for the deck panels.
Figure 12B:
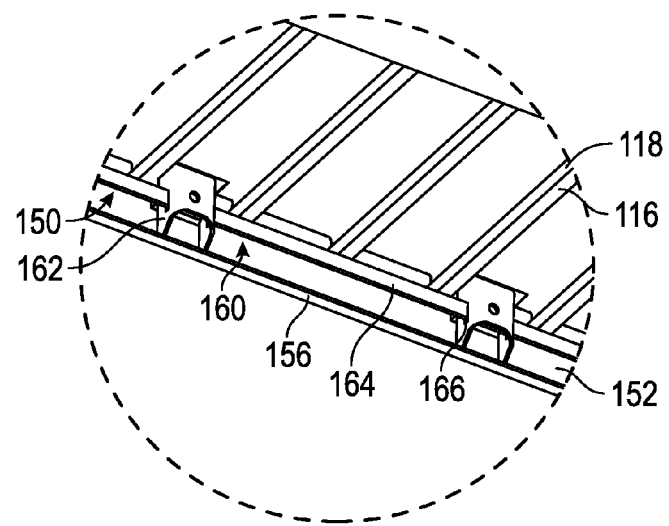
FIG. 12B is a detailed view of the support structure of FIG. 12A.

Referring to FIGS. 12A and 12B, second rubrail 106 is shown according to an exemplary embodiment. First rubrail 104 and second rubrail 106 each have a length that substantially spans the length of deck portion 102 and are spaced from each other a distance that is substantially the same as the width of deck portion 102. First rubrail 104 and second rubrail 106 each have a cross sectional shape that defines a recess (e.g., mouth, channel, etc.), shown as a cavity 150, that is open towards a centerline of carrier 10 for receiving the lateral ends of deck portion 102. According to an exemplary embodiment, first rubrail 104 and second rubrail 106 each comprise a side wall (e.g., webbing, etc.), shown as a main portion 152, a first or top wall, shown in FIG. 3 as an upper flange 154, that extends from an upper region of main portion 152 and a second or bottom wall, shown as a lower flange 156, that extends from a lower region of main portion 152. According to the embodiment illustrated, main portion 152 extends in a substantially vertical direction, while upper flange 154 and lower flange 156 extend in a direction that is substantially perpendicular to main portion 152 and parallel to each other.

In such an embodiment, first rubrail 104 and second rubrail 106 have a substantially C-shaped cross section According to an exemplary embodiment, first rubrail 104 and second rubrail 106 are formed of steel. More specifically, first rubrail 104 and second rubrail 106 are formed of a pickled and oiled steel having a yield strength of approximately 50,000 pounds per square inch (psi). According to the various alternative embodiments, first rubrail 104 and second rubrail 106 may be formed of any suitable material, including, but not limited to, a galvanized or galvanneal steel product, aluminum, composites (e.g., fiberglass, etc.), plastics, alloys, bi-metals or combinations thereof.

As indicated, main portion 152, upper flange 154 and a lower flange 156 cooperate to define cavity 150 which is sized to receive the lateral ends of deck portion 102. Deck portion 102 may be mounted directly to first rubrail 104 and second rubrail 106, or alternatively, may be mounted to an intermediate structure, shown as a deck panel support system 160. Deck panel support system 160 provides an alternative and/or additional surface for securing (e.g., welding, etc.) deck portion 102 to first rubrail 104 and second rubrail 106. For example, in an application where deck portion 102 is welded to first rubrail 104 and second rubrail 106, use of deck panel support system 160 to support deck portion 102 may reduce the number of direct welds to a side surface of first rubrail 104 and second rubrail 106. Reducing the number of welds may limit and/or eliminate blistering or distortion along first rubrail 104 and second rubrail 106, thereby improving the overall appearance of first rubrail 104 and second rubrail 106 and reducing heat affected zones.

According to an exemplary embodiment, deck panel support system 160 comprises a plurality of receiving members (e.g., supports, etc.), shown as stake pockets 162 and a deck panel support surface (e.g., rod, bar, shelf, etc.), shown as a tie-bar 164. Stake pockets 162 are spaced along the length first rubrail 104 and second rubrail 106 within cavity 150. Stake pockets 162 are shown as being substantially rectangular members that support tie-bar 164 at a position that is between upper flange 154 and lower flange 156.

According to an exemplary embodiment, stake pockets 162 define a cavity that is in communication with an opening 161 defined in upper flanges 154 of first rubrail 104 and second rubrail 106, as shown in FIG. 3. Opening 161 and the inner cavity defined by stake pocket 162 is configured to receive an optional fence or railing 163 that can be coupled to deck assembly 100 to provide additional tie down locations for straps, chains and/or wide surface hooks for load securement.

According to an exemplary embodiment, stake pockets 162 are welded to upper flange 154 and lower flange 156. To accommodate stake pockets 162, certain deck panels 112 include a cutout portion 113 at the lateral sides of platform 114 as shown in FIG. 4. Stake pockets 162 support tie-bar 164 by having tie-bar 164 pass through apertures 166 defined by stake pockets 162. Tie-bar 164 includes a upper surface that is configured to support first bottom walls 116 and second bottom walls 118 of individual deck panels 112. Tie-bar 164 has a substantially rectangular cross section, but alternatively, may have a cross section of any other suitable shape.

First bottom walls 116 and second bottom walls 118 can be welded to the upper surface of tie-bar 164 rather than or in addition to first rubrail 104 and second rubrail 106. According to the various alternative embodiments, first bottom walls 116 and second bottom walls 118 can be secured to tie-bar 164 using any other suitable coupling means including, but not limited to, mechanical fasteners, press-fit, interference fit, etc. In addition to providing an alternative and/or additional surface to secure deck portion 102, tie-bar 164 may also provide an additional tie-down location under deck portion 102 for straps, chains and/or wide surface hooks for load securement.

Referring back to FIGS. 9A and 10A, deck portion 102 is further shown as being supported by substructure 110. According to an exemplary embodiment, substructure 110 generally includes one or more support member, shown as support beams 170, provided beneath deck portion 102. Support beams 170 are configured as elongated structural or supportive members (e.g., a rail, channel, tubing, extrusion, etc.) and may be movably coupled to sub-frame 16 of carrier 100. According to the embodiment illustrated, includes a pair of support beams 170 extending in the fore and aft direction of the carrier 100 that are aligned substantially perpendicular to deck panels 112. According to an exemplary embodiment, support beams 170 are offset from first rubrail 104 and second rubrail 106 such that deck panels 112 extend beyond (i.e., overhang, etc.) support beams 170.

According to an exemplary embodiment, support beam 170 is shown as comprising a web portion 172 extending vertically between a substantially horizontal upper flange 174 and a lower flange 176 which provide for an I-beam structural beam. First bottom walls 116 and second bottom walls 118 of deck panels 112 are configured to be supported directly on top of an upper surface of upper flange 174. According to the various alternative embodiments, an intermediate member may be provided between deck panels 112 and support beams 170. According to further alternative embodiments, support beams 170 may have any of a number suitable configurations for supporting deck portion 102 (e.g., tubular, angle, C-channel, etc.).

According to an exemplary embodiment, support beams 170 are formed of steel. According to a preferred embodiment, support beams 170 are formed of a galvanized or galvanneal steel product. Such a material may allow substructure 110 to have a prolonged useful life. Such a material may also create a protective layer between the material used to form the deck portion 102 and support beams 170 thereby reducing the likelihood of corrosion at the joint. According to various alternative embodiments, support beams 170 may be formed of any other suitable material having similar properties of steel (e.g., high strength, rigid, etc.).

Figure 13A:
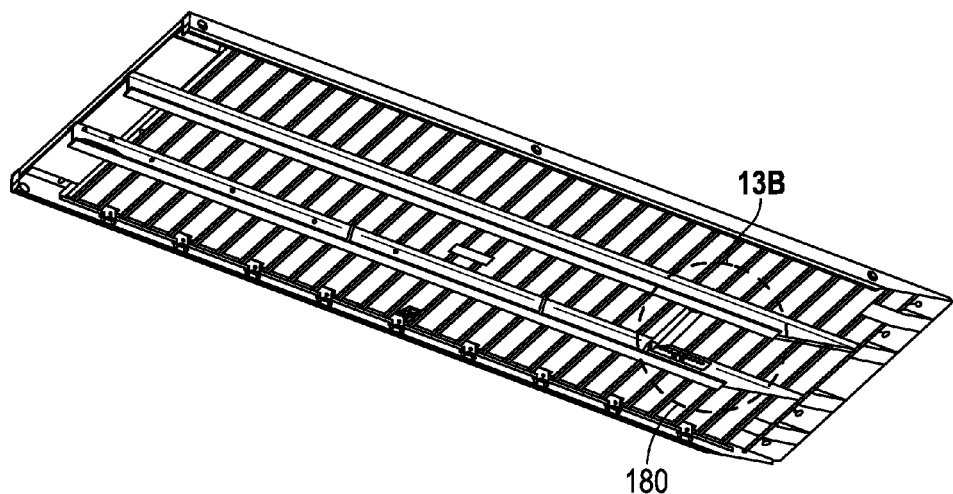
FIG. 13A is a bottom isometric view of the deck assembly of FIG. 3 showing an adjustable mounting device for an actuator used to move the deck assembly relative to a sub-frame.
Figure 13B:
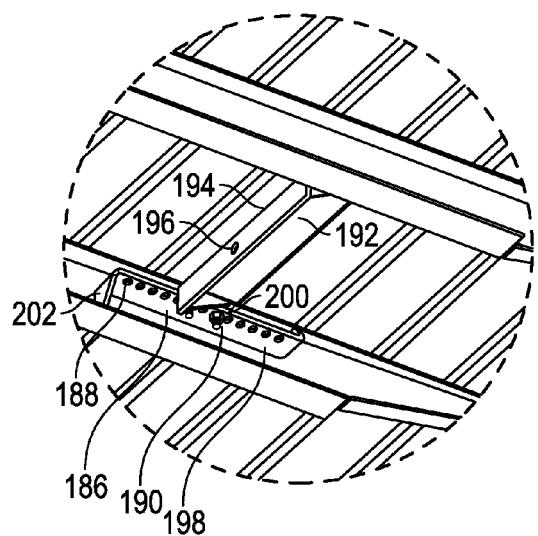
FIG. 13B is a detailed view of the adjustable mounting device of FIG. 13A.
Figure 14:
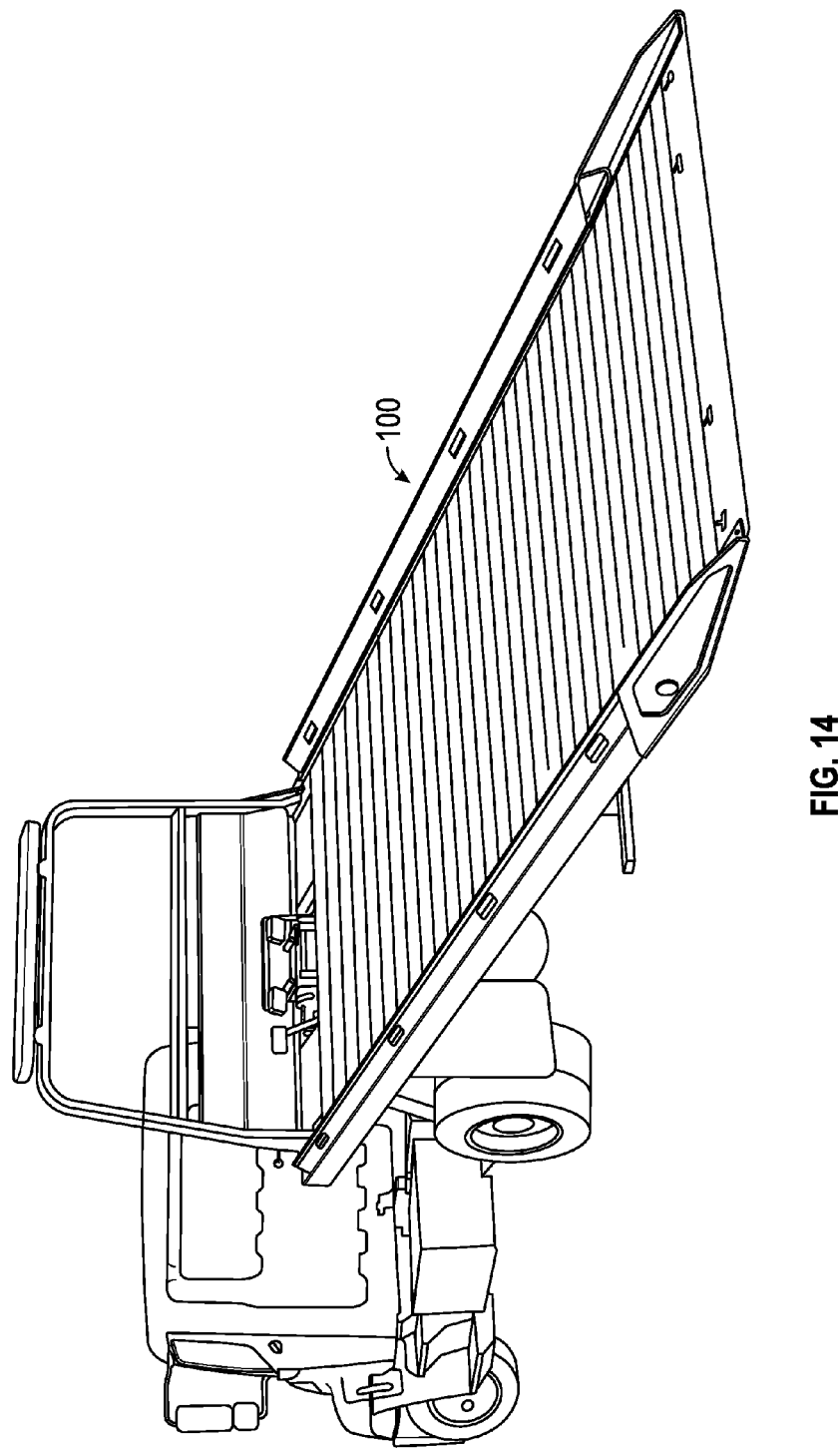
FIG. 14 is an isometric view of a transporter vehicle having a deck assembly according to another exemplary embodiment.
Figure 15:
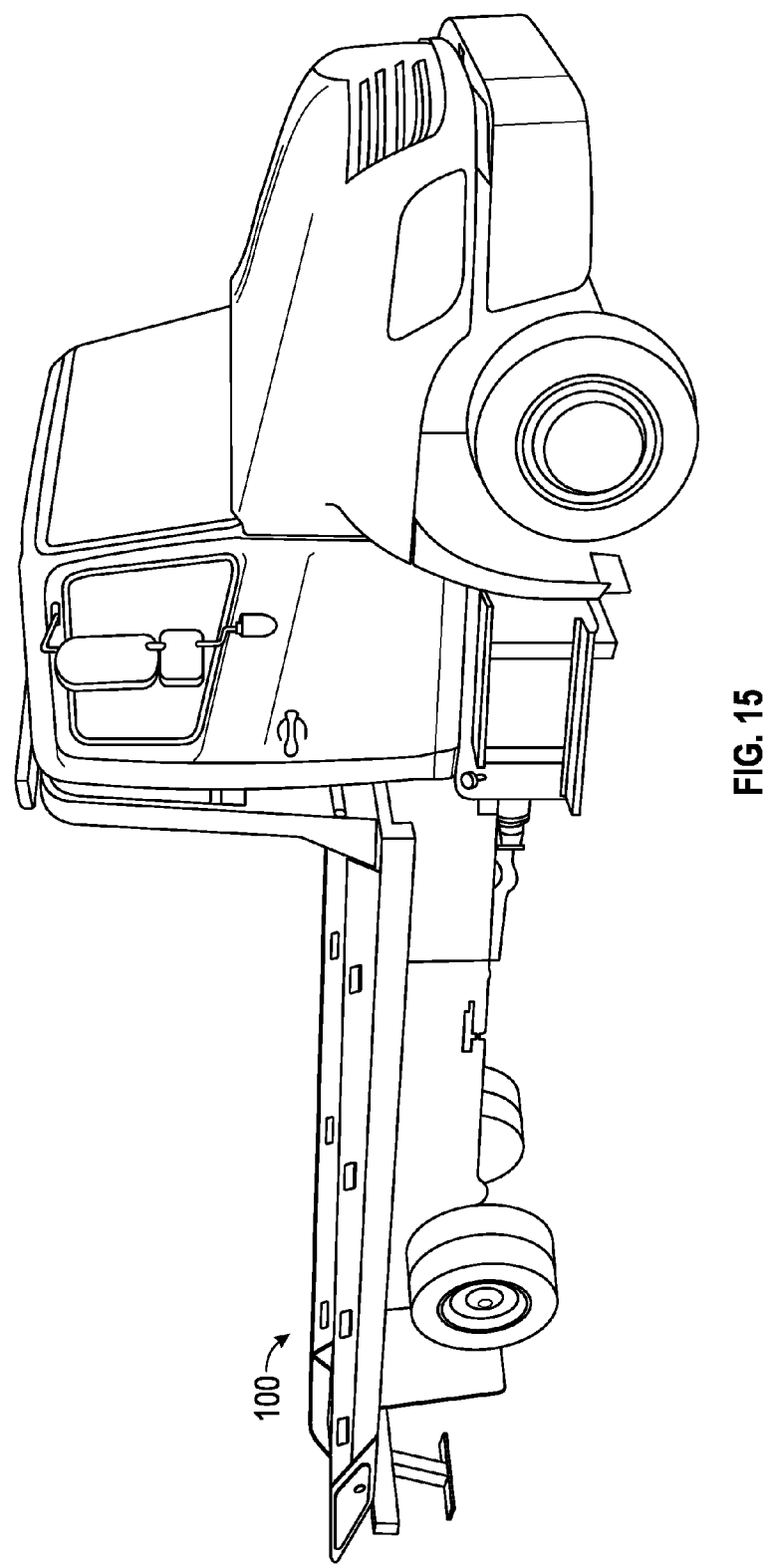
FIG. 15 is an isometric view of the transporter vehicle of FIG. 14 showing the deck assembly in a transport position.
Figure 16:
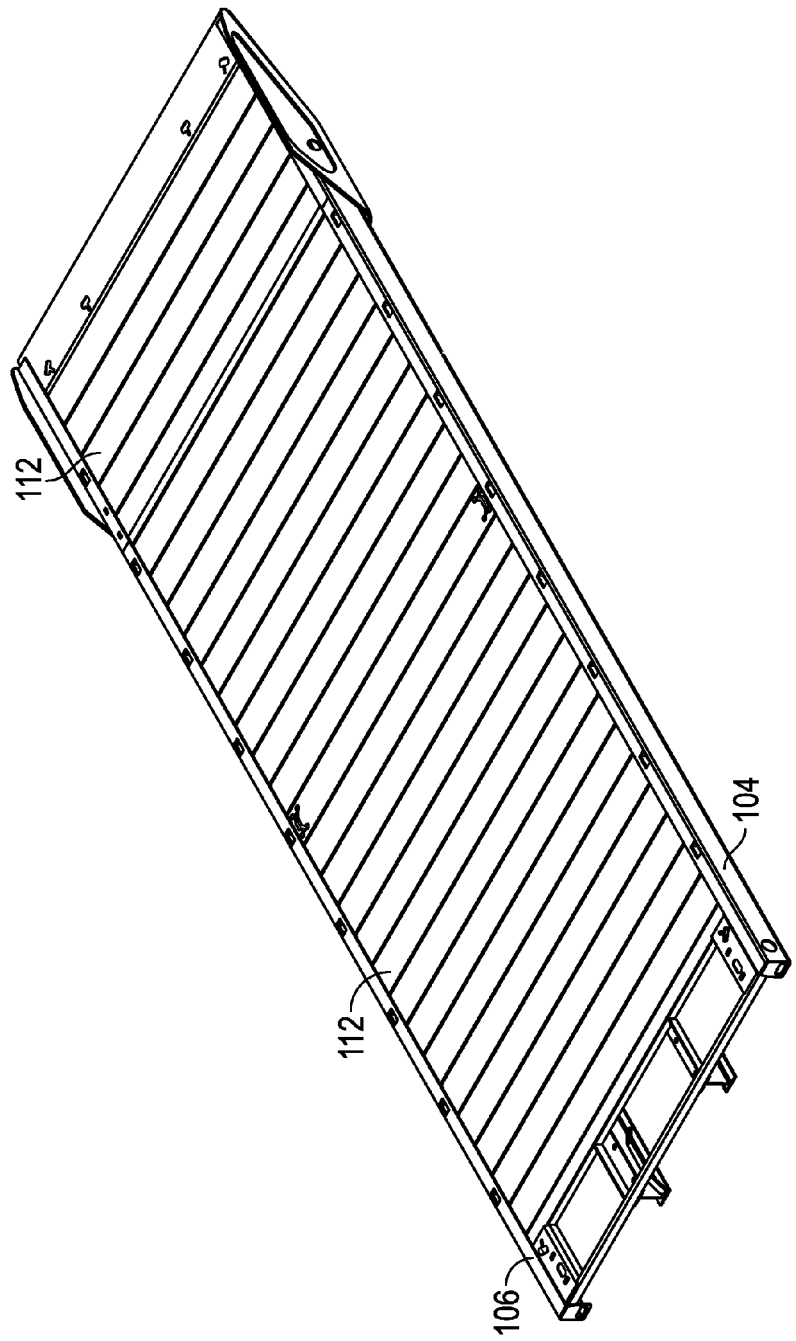
FIG. 16 is a top isometric view of the deck assembly of FIG. 14.
Figure 17:
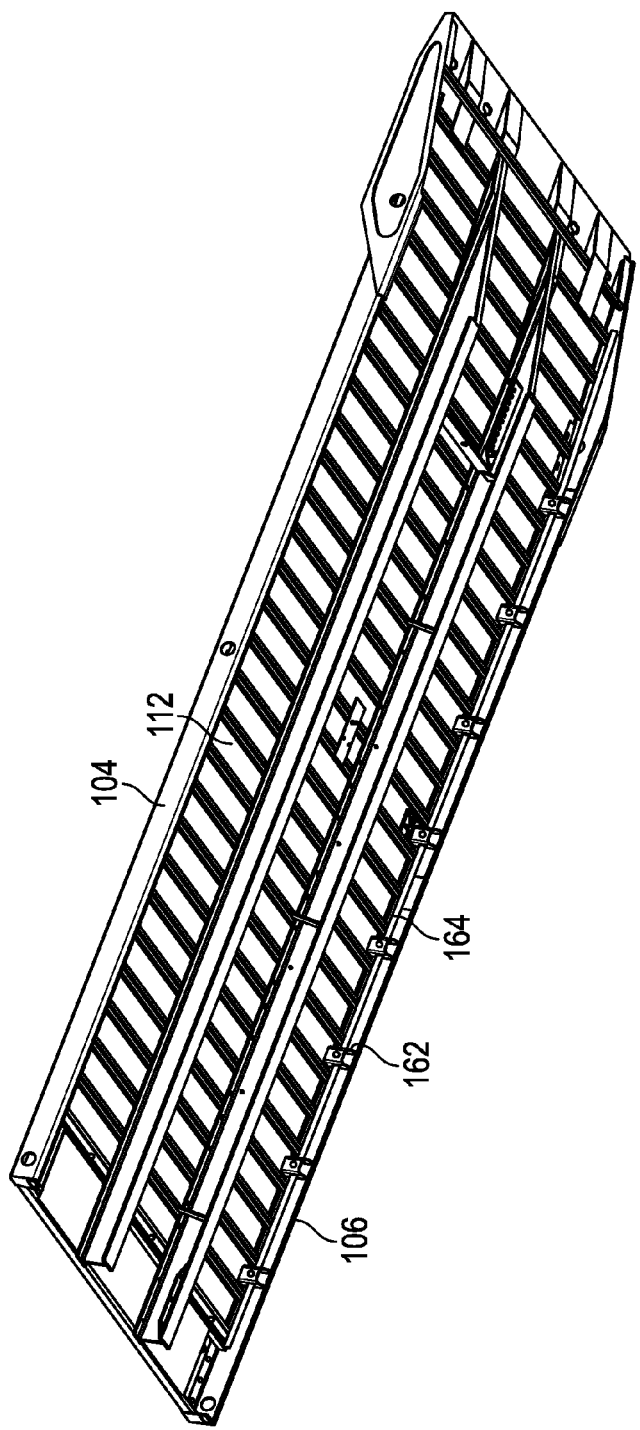
FIG. 17 is a bottom isometric view of the deck assembly of FIG. 14.

Referring to FIGS. 13A and 13B, deck assembly 100 is further shown as comprising an adjustable mounting system 180 for mounting an actuator (e.g., a roll-back cylinder, etc.) used to slide deck assembly 100 relative to sub-frame 16 and/or chassis 12 to deck assembly 100. Adjustable mounting system 180 may simplify the installation of deck assembly 100 on vehicles having different chassis lengths, cab configurations and/or rear axle positions. Such a system allows the distance between the back of cab 14 and the front of deck assembly 100 to be adjusted and set from a location under deck assembly 100 that is relatively easy to access.

According to an exemplary embodiment, adjustable mounting system 180 includes an actuator mount (e.g., support member, etc.), shown as a mounting bracket 182, a first support member, shown as a first support bracket 184, and a second support member, shown as a second support bracket 186. First support bracket 184 is configured to be secured (e.g., welded, etc.) in a fixed manner to one of support beams 170, while second support bracket 186 is configured to be secured (e.g., welded, etc.) in a fixed manner to the other of support beams 170. With first support bracket 184 and second support bracket 186 installed, mounting bracket 182 can be selectively positioned and secured along first support bracket 184 and second support bracket 186.

To facilitate the selective positioning of mounting bracket 182, first support bracket 184 and second support bracket 186 each comprise a series of apertures, shown as first openings 188, located at predetermined spacing along their lengths. Each lateral side of mounting bracket 182 is provided with one or more corresponding apertures, shown as second openings 190. Mounting bracket 182 can be selectively moved along the lengths of first support bracket 184 and second support bracket 186 to achieve the desired positioning of deck assembly 100 is achieved. Once this position is achieved, second openings 190 can be aligned with the nearest first openings 188 and a fastener, such as a mechanical fastener, can be inserted therethrough to secure mounting bracket 182 in place.

According to an exemplary embodiment, first support bracket 184 and second support bracket 186 have a length that may allow for between approximately 10 inches and approximately 20 inches in adjustability. According to the embodiment illustrated, this range of adjustability can be increased by turning the orientation of mounting bracket 182 (e.g., forward to backward, etc.). For example, mounting bracket 182 is shown as being a substantially L-shaped member having a generally horizontal wall, shown as a first wall 192, and generally vertical wall, shown as a second wall 194. First wall 192 defines the one or more second openings 190, while second wall defines one or more apertures, shown as third openings 196, for receiving an end of the actuator (e.g., cylinder, etc.). The additional range of adjustability can be achieved by turning mounting bracket 182 to either have second wall 194 facing the front or rear of carrier 10.

According to an exemplary embodiment, first support bracket 184 and second support bracket 186 have a configuration that allows the location of mounting bracket 182 to be selectively adjusted while first support bracket 184 and second support bracket 186 are fixed to support beams 170. According to the embodiment illustrated, first support bracket 184 and second support bracket 186 each includes a central portion 198 that defines first openings 188, a first support leg or tab 200 configured to be secured to upper flange 174 of support beam 170 and second support leg or tab 202 configured to be secured to lower flange 176 of support beam 170. First support tab 202 and second support tab 204 are sized so that first wall 190 of mounting bracket 182 can fixed between a bottom surface of upper flange 174 of support beam 170 and an upper surface of central portion 198 of first support bracket 184 and second support bracket 186.

With regard to the serviceability of deck assembly 100 after a carrier 10 has been in use, the panelized deck design detailed above may advantageously allow for individual deck panels 112 to be removed and replaced without taking apart the entire deck portion 102 and/or a larger portion thereof.

Referring to FIGS. 14 through 17, deck assembly 100 is shown according to a second alternative embodiment. Deck assembly 100 of FIGS. 14 through 17 is different than the deck assembly detailed above in that deck surface 108 angles upward at the rear end of deck portion 102. Such a configuration may improve the approach angle for a vehicle and/or other object being loaded on and/or removed from deck surface 108. A deck assembly having such a shape is disclosed in U.S. Pat. No. 5,133,633, the complete disclosure of which is hereby incorporated by reference in its entirety.

It is important to note that the construction and arrangement of the deck assembly as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, elements shown as multiple parts may be integrally formed, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the exemplary embodiments without departing from the scope of the present inventions as expressed in the appended claims.

What is claimed is:

1. A deck assembly for a transporter vehicle, the deck assembly comprising:
   a fastener;
   a first deck panel including an upper support surface, a first side wall and a second side wall, the first side wall defining at least one first opening, the second side wall defining at least one second opening, wherein the first deck panel further includes a first flange extending from a lower edge of the first side wall toward the second side wall and a second flange extending from a lower edge of the second side wall toward the first side wall; and
   a second deck panel coupled to the first deck panel, the second deck panel including an upper support surface, a first side wall and a second side wall, the first side wall defining at least one first opening, the second side wall defining at least one second opening, wherein the second deck panel further includes a first flange extending from a lower edge of the first side wall toward the second side wall and a second flange extending from a lower edge of the second side wall toward the first side wall,
   wherein the second side wall of the first deck panel is supported adjacent to the first side wall of the second deck panel such that the at least one first opening of the first deck panel is at least partially aligned with the at least one second opening of the second deck panel to define a through hole for the fastener,
   wherein the fastener is received within the through hole and secures the first deck panel to the second deck panel,
   wherein the first deck panel and the second deck panel extend in a direction that is transverse to a longitudinal direction of the deck assembly.

2. The deck assembly of claim 1, wherein the at least one first openings of the first deck panel and the second deck panel have a first dimension and the at least one second openings of the first deck panel and the second deck panel have a second dimension that is less than the first dimension.

3. The deck assembly of claim 2, wherein the fastener defines a longitudinal axis and engages an edge of the first deck panel that defines the at least one second opening forming part of the through hole in a manner that restricts the fastener from rotating along the longitudinal axis.

4. The deck assembly of claim 3, wherein the fastener comprises a flange provided at a first end of the fastener and a threaded portion provided at a second end of the fastener, wherein the threaded portion defines the longitudinal axis, and wherein the flange engages the edge of the first deck panel that defines the at least one second opening forming part of the through hole.

5. The deck assembly of claim 4, wherein the fastener is a one-side carriage bolt fastener that is configured to receive a nut on the threaded portion.

6. The deck assembly of claim 2, wherein the at least one first openings of the first deck panel and the second deck panel and the at least one second openings of the first deck panel have substantially the same shape.

7. The deck assembly of claim 6, wherein the at least one first openings of the first deck panel and the second deck panel and the at least one second openings of the first deck panel have a shape that is substantially square.

8. The deck assembly of claim 1, wherein the upper support surfaces of the first deck panel and the second deck panel each comprise a central portion having a traction surface while the remaining outer surfaces of the first deck panel and second deck panel are substantially smooth.

9. The deck assembly of claim 8, wherein the traction surface comprises an embossed tread pattern.

10. The deck assembly of claim 1, wherein the upper support surfaces of the first deck panel and the second deck panel each comprise an outwardly extending crown that is between approximately 0.020 inches and approximately 0.030 inches.

11. The deck assembly of claim 1, wherein the first deck panel and the second deck panel are formed of at least one of a galvanized and a galvanneal steel product.

12. The deck assembly of claim 1, wherein the first side walls and the second side walls of the first deck panel and the second deck panels are substantially perpendicular to the upper support surfaces of the first deck panel and the second deck panel.

13. The deck assembly of claim 1, further comprising a substructure for supporting the first deck panel and the second deck panel, wherein the first flanges and the second flanges are configured to be secured to the substructure.

14. A transporter vehicle comprising:
a chassis;
a cab supported by the chassis;
a deck assembly supported by the chassis rearward of the cab, the deck assembly comprising a first side board, a second side board, a substructure and a deck portion, the deck portion is supported by the first side board, a second side board and a substructure and comprising:
a fastener;
a first deck panel including an upper support surface, a first side wall and a second side wall, the first side wall defining at least one first opening, the second side wall defining at least one second opening, wherein the first deck panel further includes a first flange extending from a lower edge of the first side wall toward the second side wall and a second flange extending from a lower edge of the second side wall toward the first side wall; and
a second deck panel coupled to the first deck panel, the second deck panel including an upper support surface, a first side wall and a second side wall, the first side wall defining at least one first opening, the second side wall defining at least one second opening, wherein the second deck panel further includes a first flange extending from a lower edge of the first side wall toward the second side wall and a second flange extending from a lower edge of the second side wall toward the first side wall,
wherein the second side wall of the first deck panel is supported adjacent to the first side wall of the second deck panel such that the at least one first opening of the first deck panel is at least partially aligned with the at least one second opening of the second deck panel to define a through hole for the fastener,
wherein the fastener is received within the through hole and secures the first deck panel to the second deck panel,
wherein the first deck panel and the second deck panel extend in a direction that is transverse to the first side board and the second side board.

15. The transporter vehicle of claim 14, wherein the at least one first openings of the first deck panel and the second deck panel have a first dimension and the at least one second openings of the first deck panel and the second deck panel have a second dimension that is less than the first dimension, and wherein the fastener defines a longitudinal axis and engages an edge of the first deck panel that defines the at least one second opening forming part of the through hole in a manner that restricts the fastener from rotating along the longitudinal axis.

16. The transporter vehicle of claim 14, wherein the first side board and the second side board each define a cavity that faces a centerline of the vehicle, and wherein the deck assembly further comprises a deck panel support system received within each cavity, the deck panel support system comprising:
a plurality of vertical support members coupled to the first side board and the second side board and positioned along the length of the cavity defined by the respective first side board and second side board; and
a first bar associated with and offset from the first side board and a second bar associated with and offset from the second side board, the first bar and the second bar extending between the respective vertical support members,
wherein the first bar and the second bar provide a coupling surface for the lateral edges of the deck portion.

17. The transporter vehicle of claim 14, wherein the transporter vehicle is a carrier vehicle having a sub-frame supported by the chassis and configured to rotate relative to the chassis via a first powered actuator, and wherein the deck assembly is supported by the sub-frame and configured to slide relative to the sub-frame via a second powered actuator.

18. A transporter vehicle comprising:
a chassis;
a cab supported by the chassis;
a deck assembly supported by the chassis rearward of the cab, the deck assembly comprising a first side board, a second side board, a substructure and a deck portion, the deck portion is supported by the first side board, a second side board and a substructure and comprising:
a fastener;
a first deck panel including an upper support surface, a first side wall and a second side wall, the first side wall defining at least one first opening, the second side wall defining at least one second opening; and
a second deck panel coupled to the first deck panel, the second deck panel including an upper support surface, a first side wall and a second side wall, the first side wall defining at least one first opening, the second side wall defining at least one second opening,
wherein the second side wall of the first deck panel is supported adjacent to the first side wall of the second deck panel such that the at least one first opening of the first deck panel is at least partially aligned with the at least one second opening of the second deck panel to define a through hole for the fastener, wherein the fastener is received within the through hole and secures the first deck panel to the second deck panel, wherein the transporter vehicle is a carrier vehicle having a sub-frame supported by the chassis and configured to rotate relative to the chassis via a first powered actuator, and wherein the deck assembly is supported by the sub-frame and configured to slide relative to the sub-frame via a second powered actuator, and wherein the substructure comprises a first beam and a second beam that each comprise an upper flange, a lower flange and a webbing extending between the upper flange and the lower flange, wherein the substructure supports an adjustable mounting system for mounting the second powered actuator to the deck assembly and selectively adjusting the position of the deck assembly relative to the cab, the adjustable mounting system comprising:

a first support bracket fixedly coupled to the first beam, the first support bracket defining a first series of holes provided at predetermined spacing along its length;

a second support bracket fixedly coupled to the second beam, the second support bracket defining a second series of holes provided at predetermined spacing along its length; and an actuator support bracket extending between the first support bracket and the second support bracket, the actuator support bracket being supported between an upper surface of the first support bracket and the second support bracket and a lower surface of the upper flange of the first beam and the second beam, the actuator support bracket defining at least one third opening configured to be selectively aligned with the first series of holes and at least one fourth opening configured to be selectively aligned with the second series of holes.

19. A method of assembling a deck assembly for a transporter vehicle having a first side board, a second side board, a substructure and a deck portion, the method comprising:

preassembling the deck portion, the deck portion comprising a plurality of deck panels, the deck panels each including an upper support surface, a first side wall and a second side wall, a first flange extending from a lower edge of the first side wall toward the second side wall and a second flange extending from a lower edge of the second side wall toward the first side wall, the first side wall defining at least one first opening having a first dimension, the second side wall defining at least one second opening having a second dimension that is less than the first dimension, the method of preassembling the deck portion comprising:

positioning a first deck panel parallel and adjacent to a second deck panel such that the at least one second opening of the first deck panel is substantially aligned with the at least one first opening of the second deck panel to define a through hole, wherein the first deck panel and the second deck panel are positioned along a direction that is transverse to a longitudinal direction of the deck assembly;

inserting a fastener into the through hole by first passing through the second side wall of the first deck panel and then through the first wall of the second deck panel, the fastener having a flange and a threaded portion;

engaging the flange with an edge of the second wall of the first deck panel that defines the at least one second opening to restrict the rotation of the fastener; and applying a nut to the threaded portion of the fastener to draw the first deck panel against the second deck panel;

mounting the preassembled deck portion to the substructure;

mounting the first side board to a first lateral edge of the preassembled deck portion; and mounting the second side board to an opposite second lateral edge of the preassembled deck portion.

20. The transporter vehicle of claim 18, wherein the upper support surfaces of the first deck panel and the second deck panel each comprise an outwardly extending crown.

* * * * *